United States Patent [19]

Shinryo et al.

[11] Patent Number: 5,105,115

[45] Date of Patent: Apr. 14, 1992

[54] DYNAMOELECTRIC MACHINE

[75] Inventors: Yuukou Shinryo; Masaharu Maruno, both of Fukuoka, Japan

[73] Assignee: Mitsubishi Denki Kabushiki Kaisha, Japan

[21] Appl. No.: 562,922

[22] Filed: Aug. 6, 1990

[30] Foreign Application Priority Data

Aug. 7, 1989 [JP] Japan ................... 1-202771

[51] Int. Cl.⁵ .............................. H02K 1/12
[52] U.S. Cl. .................... 310/258; 310/44; 310/45; 310/208
[58] Field of Search .......... 310/208, 254, 259, 89, 310/44, 45, 86, 258; 29/596

[56] References Cited

U.S. PATENT DOCUMENTS

| | | | |
|---|---|---|---|
| 4,352,897 | 10/1982 | Ogata et al. | 310/43 |
| 4,456,844 | 6/1984 | Yamamoto et al. | 310/87 |
| 4,496,866 | 1/1985 | Yamamoto et al. | 310/87 |
| 4,651,039 | 3/1987 | Yamamoto et al. | 310/87 |

FOREIGN PATENT DOCUMENTS

59-209043 6/1984 Japan .
60-131041 7/1985 Japan .
63-23523 1/1988 Japan .

*Primary Examiner*—Steven L. Stephan
*Assistant Examiner*—E. To
*Attorney, Agent, or Firm*—Leydig, Voit & Mayer

[57] ABSTRACT

A dynamoelectric machine having a stator which is composed of a stator core formed of a mold resin containing silicon steel powder, and a magnetic field generating coil having coil turns arranged to generate sine-wave magnetic fields and embedded in the mold resin of the stator core. The coil ends of the coil turns of the magnetic field generating coil are bent so as to extend along both side surfaces of the stator core. Disclosed also is a method of producing this stator.

6 Claims, 10 Drawing Sheets

(B) MAGNETOMOTIVE FORCE OF COILS 1-4, 4-7··· (U-PHASE)

MAIN COIL SIDE

START COIL SIDE (B) MAGNETOMOTIVE FORCE OF COIL a (C) MAGNETOMOTIVE FORCE OF COIL b (D) COMPOSITE MAGNETOMOTIVE FORCE OF MAIN COIL

FIG. 16

DYNAMOELECTRIC MACHINE

BACKGROUND OF THE INVENTION

1. Field of the Invention

The present invention relates to a dynamoelectric machine and, more particularly, to a dynamoelectric machine of the type in which a magnetic field is generated by a magnetic field generating coil supplied with an electrical current.

2. Description of the Related Art

Figure 1:
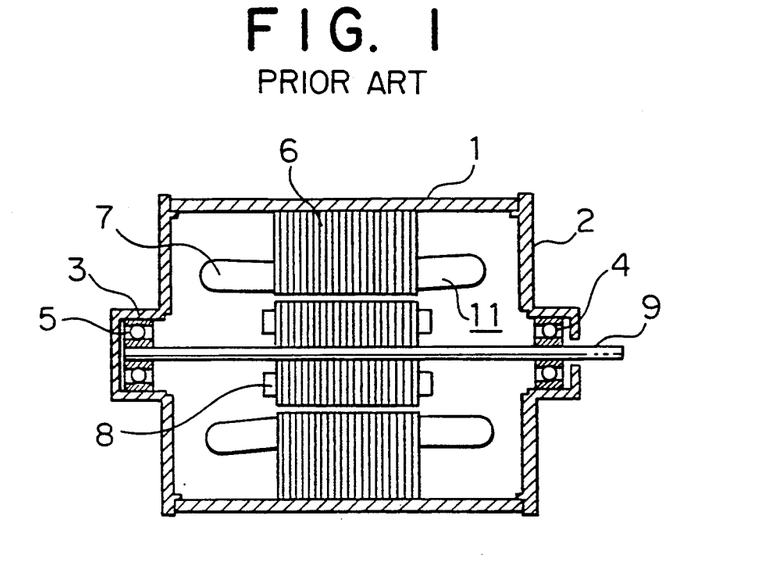
FIG. 1 is a sectional view of a known dynamoelectric machine.
Figure 2:
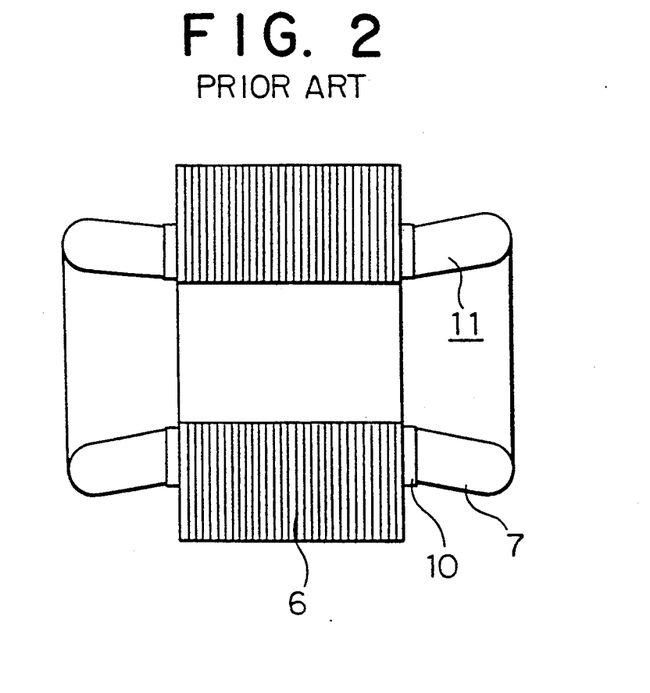
FIG. 2 is a sectional view of a stator incorporated in the electric machine shown in FIG. 1.

FIG. 1 is a sectional view of a conventional dynamoelectric machine, e.g., an electric motor, and FIG. 2 is a sectional view of a stator of the machine shown in FIG. 1. Referring to these figures, the dynamoelectric machine has a casing composed of a motor frame 1, a loadside bracket 2 and another bracket 3 opposite to the loadside bracket 2. The brackets 2 and 3 respectively support bearings 4 and 5. The machine also has a stator core 6 which has a laminated structure composed of a plurality of stator core plates 6a (see FIG. 3). Numeral 7 denotes coil ends which are ends of a magnetic field generating coil 11 which is wound through later-mentioned slots (see FIG. 4) of the stator core 6. A rotor 8 is composed of an armature core and an aluminum die cast member. A motor shaft 9 integral with the rotor 8 is rotatably supported by the bearings 4 and 5. An insulator 10 electrically insulates the stator core 6 from the magnetic field generating coil 11 (including the coil ends 7).

Figure 3:
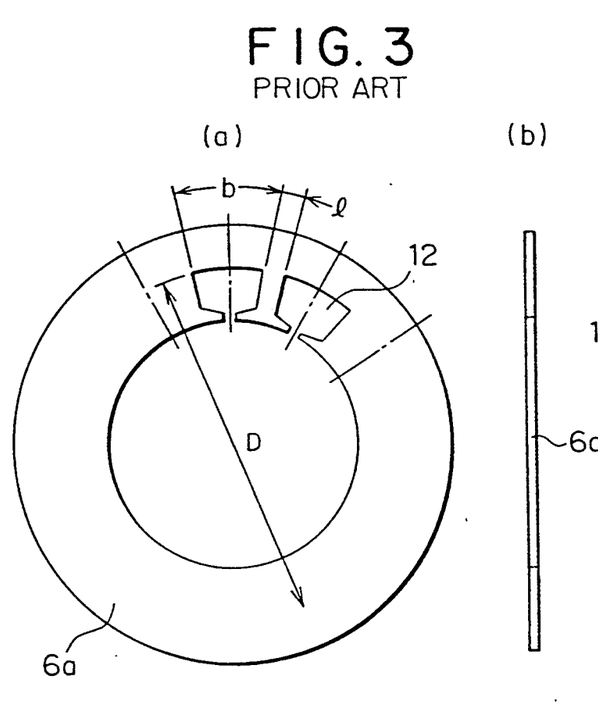
FIG. 3 is an illustration of a single element of stator core plate for forming the stator core shown in FIG. 2.
Figure 4:
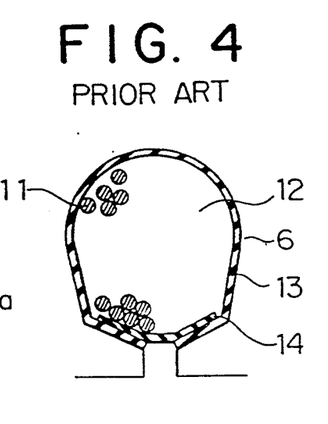
FIG. 4 is an enlarged view of a slot formed in the stator core plate shown in FIG. 3.

FIGS. 3(a) is a plan view of the single element of the stator core plate 6a of the stator core 6 before the lamination, while FIG. 3(b) is a side view of the stator core plate 6a. FIG. 4 is an enlarged view of a slot portion 12 which receives a magnetic field generating coil 11. A throttle cell 13 for providing electrical insulation between the magnetic field generating coil 11 and the stator core 6 is provided around the magnetic field generating coil 11. Slot wedges 14 are provided for preventing the magnetic field generating coil 11 from coming out of the slot 12.

Figure 5:
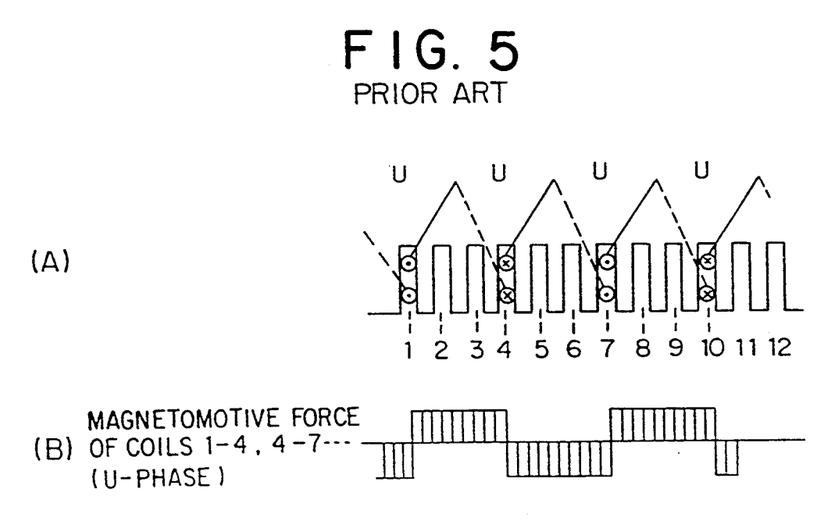
FIG. 5 is an illustration of a coil arrangement on the stator core of FIG. 2 adopted when the stator core is of 3-phase 4-pole type, showing also magnetomotive forces produced by the coils.
Figure 6:
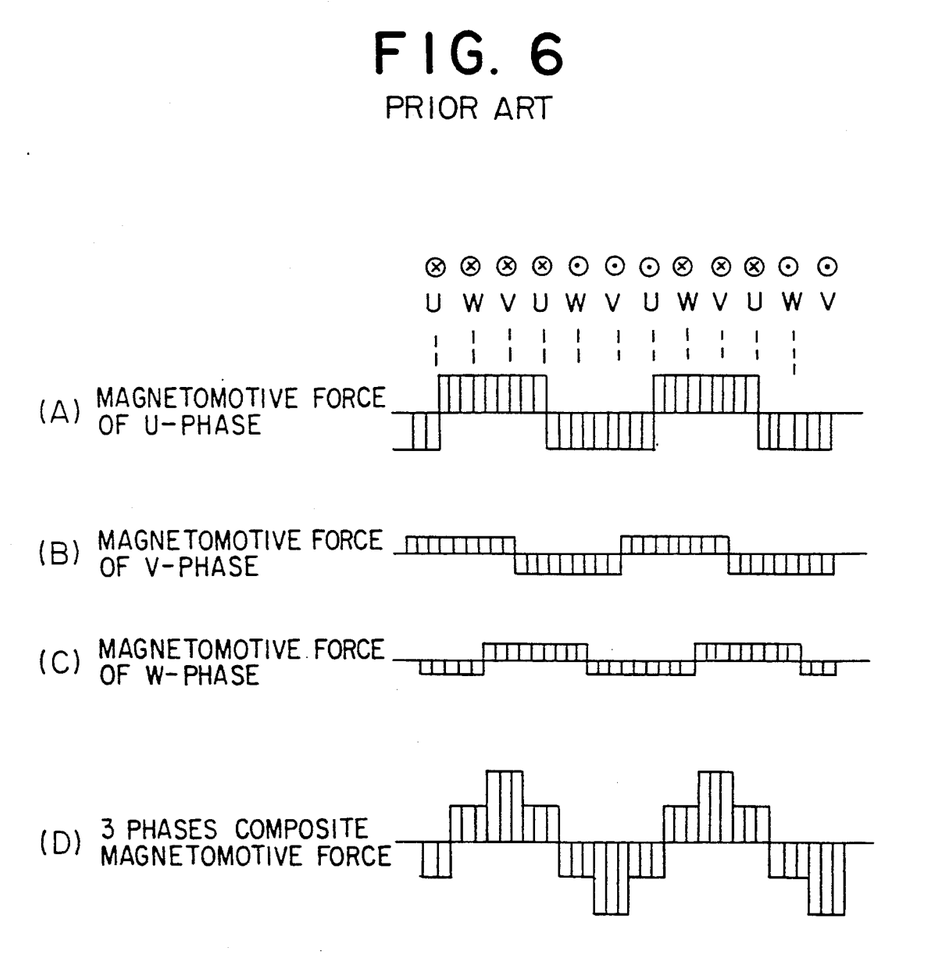
FIG. 6 is an illustration of the magnetomotive forces produced by the respective phases of the stator core of FIG. 5, showing also 3-phase composite magnetomotive force.
Figure 7:
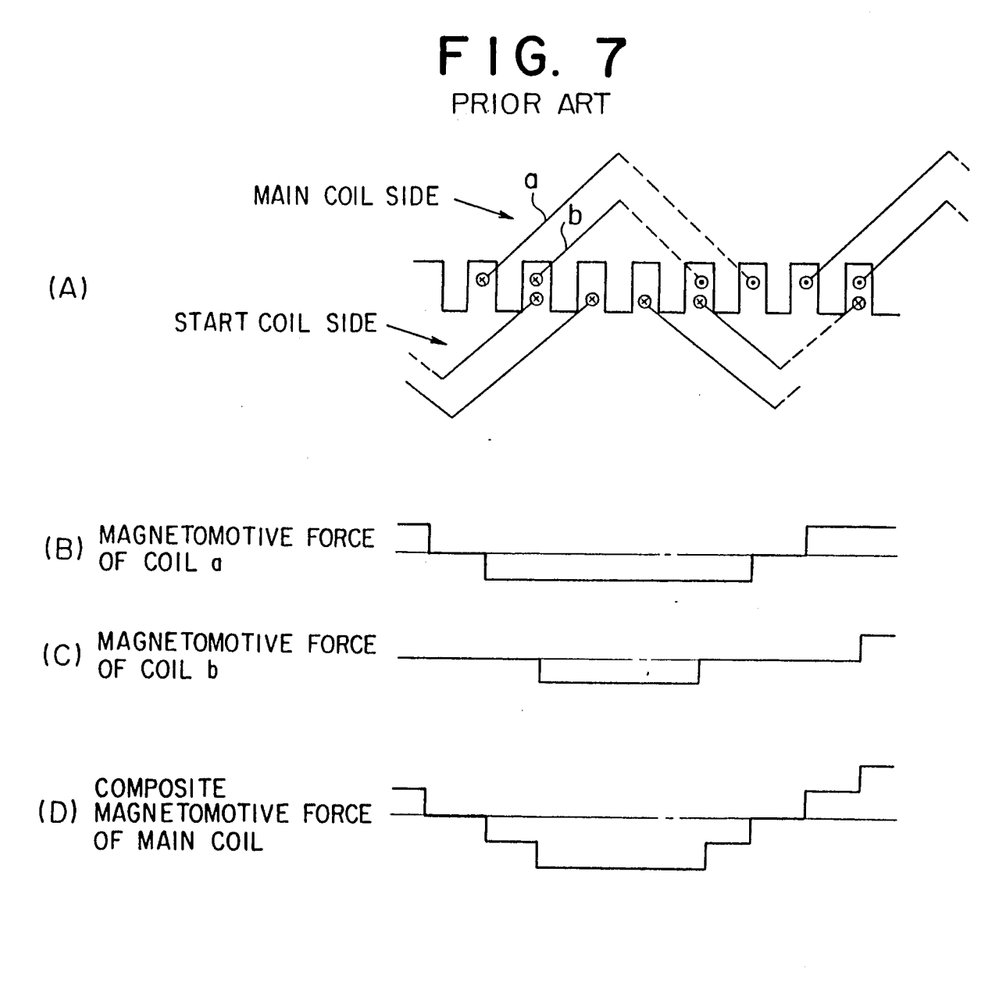
FIG. 7 is an illustration of a coil arrangement on the stator core of FIG. 2 adopted when the stator core is of single-phase 4-pole type, showing also the magnetomotive forces produced by the coils.

FIGS. 5 and 6 show the arrangement of coils which is adopted when the stator core 6 has 12 slots to realize a 3-phase 4-pole construction, as well as magnetomotive forces of the respective phases and the composite megnetomotive force produced by all the phases. FIG. 7 shows an example of the coil arrangement of single-phase 4-pole stator core with 24 slots.

The operation of this known machine is as follows.

A description will be given first of the process of producing the stator core, as well as the principle of generation of the magnetomotive force which produces the torque for driving the machine which is, in this case, a motor. Stator core plates 6a of the type shown in FIG. 3 are formed as the first step of the production process. When the motor is a 3-phase motor, the following condition is generally met:

$$Ns = q/(p \times 3)$$

where, Ns represents the total number of the slots in the stator core plate, q represents the number of slots for each pole in each phase, and p represents the number of poles.

The greater the number q of slots for each pole in each phase, the higher the motor performance. An excessively large total number Ns of the slots, however, causes the circumferential length occupied by the slot widths b to be increased, so that the slot intersal l is decreased excessively, with the result that the strength of the stator core is decreased impractically.

In addition, insufficient strength of the slot interval portions l tends to cause a problem in that the edges of the slots 12 of the stacked stator core plates 6a in the laminated stator core 6 are not registered, making it impossible to insert the coils into the slots 12. Usually, the slot interval l is 2.5 mm or so at the smallest.

In this case, the following condition is met:

$$\pi D/Ns - = b$$

where, D represents the diameter of the portion of the stator core plate where the slots are formed (see FIG. 3(a)).

Therefore, the total slot number Ns can be written as follows.

$$Ns = \pi D/(b+l)$$

The total number Ns of the slots can be increased by decreasing the slot width b. A reduction in the slot width b, however, produces the following problem. Namely, the proportion of the space in each slot 12 occupied by the slot cell 13 and the slot wedge 14 serving as an insulator is increased to correspondingly decrease the space factor, i.e., the portion of the space in each slot which is to be occupied by the magnetic field generating coil 11. In the worst case, it becomes impossible to insert the magnetic field generating coil into the slot 12.

For these reasons, ordinary small-sized 4-pole motors have 12, 24 or 36 slots.

Referring back to the production process, a plurality of stator core plates 6a shown in FIG. 3 are stacked to form a laminated stator core 6. Then, slot cells 13 (see FIG. 4) are inserted into the respective slots 12, followed by insertion of the magnetic field generating coils 11 into these slots. Then, slot wedges 14 are fitted into the slots 12, whereby the stator is completed as shown in FIG. 2.

FIGS. 5 and 6 show the magnetomotive forces produced by the respective phases, as well as the composite magnetomotive force produced by all these phases, when the stator core 6 is of 3-phase 4-pole type. FIG. 5(A) shows the manner in which the field generating coil of the U phase, as the representative of three phases U, V and W, is inserted, while FIG. 5(B) shows the magnetomotive force of the coil on each pole of the U phase. In FIG. 6, (A), (B) and (C) respectively show the magnetomotive forces produced by the U, V and W phases, while FIG. 6(D) shows the composite magnetomotive force produced by the three phases. The characteristics shown in these figures are obtained on an assumption that when the current in the U phase is at the maximum value Im, the currents in the V and W phases are $-Im/2$. Since the magnetic field generating coils of the U, V and W phases have an equal number of turns, the waveform of the composite 3-phase magnetomotive force does not change in relation to the elapse of time, although the composite magnetic field moves in the direction of rotation.

FIG. 7(A) shows the manner of insertion of the main coils of the magnetic field generating coil in a stator core of of single-phase 4-pole type with 24 slots. FIGS. 7(B) and 7(C) show the magnetomotive forces produced by the main coils a and b. FIG. 7(D) shows the composite magnetomotive force produced by these main coils. When the current in the level of the current in the main coil is changed, the height of the waveform of the composite magnetic motive force is changed but no change is caused in the waveform. In case of the single phase motor, the numbers of turns of the main coils a and b may be different from each other. The characteristic shown in FIG. 7, however, is obtained when the main coils a and b have an equal number of turns. Any difference in the number of turns between the main coils a and b only causes a change in the levels of the magnetomotive forces.

In the stator of the conventional dynamoelectric machine, it it not permitted to limitlessly increase the total number of slots. Namely, the total number of the slots must be a small definite number. This makes it impossible to generate a magnetic field of sine waveform. On the other hand, an increase in the total number of slots requires an increase in the diameter of the stator core, so that the efficiency of the motor is decreased due to generation of extraordinary torque and high-frequency loss. In addition, the temperature of the motor is raised undesirably.

SUMMARY OF THE INVENTION

Accordingly, an object of the present invention is to provide a dynamoelectric machine in which a stator core can produce a magnetic field which can approximate sine waveform with higher degree of approximation and in which generation of extraordinary torque and high-frequency loss are minimized, thereby overcoming the above-described problems of the related art.

To this end, according to the present invention, there is provided a dynamoelectric machine comprising: a rotor; a rotor shaft to which the rotor is fixed; a stator including a magnetic field generating coil including a plurality of coil turns arranged around the rotor so as to produce magnetic fields having waveforms approximating a sine waveform, each of said coil turns having coil ends on both ends thereof as viewed in the direction of axis of the rotor shaft, and a stator core made of a mold resin containing a silicon steel powder and integrally embedding the magnetic field generating coil such that the coil ends are exposed from both ends of the stator core; and a casing fixing and supporting the stator so as to cover the stator and rotatably supporting the rotor shaft.

The invention also provides a stator of a dynamoelectric machine, as well as a method of producing the same.

According to the invention, magnetic field generating coils, which are arranged to generate sine wave magnetic fields, are resin-sealed by a mold resin containing powdered silicon steel, except the coil end portions. The stator core is formed by this mold resin containing the silicon steel powder. It is thus possible to obtain magnetic fields which approximate sine waveforms with greater degree of approximation.

DESCRIPTION OF THE PREFERRED EMBODIMENTS

The invention will be described in detail through its preferred embodiments with reference to the accompanying drawings.

Figure 8:
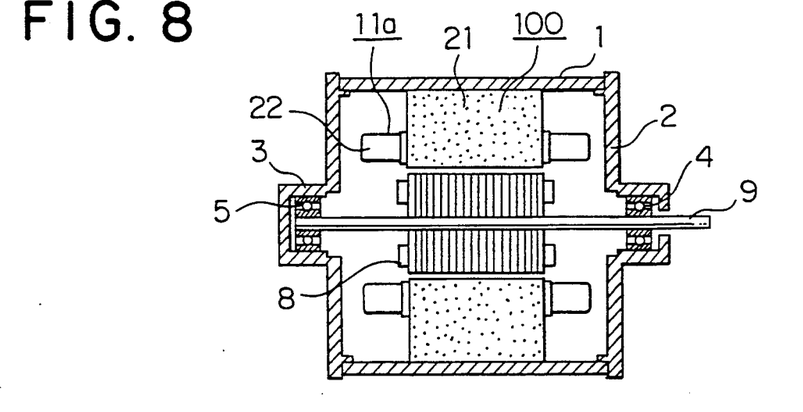
FIG. 8 is a sectional view of a dynamoelectric machine in accordance with an embodiment of the present invention.
Figure 9:
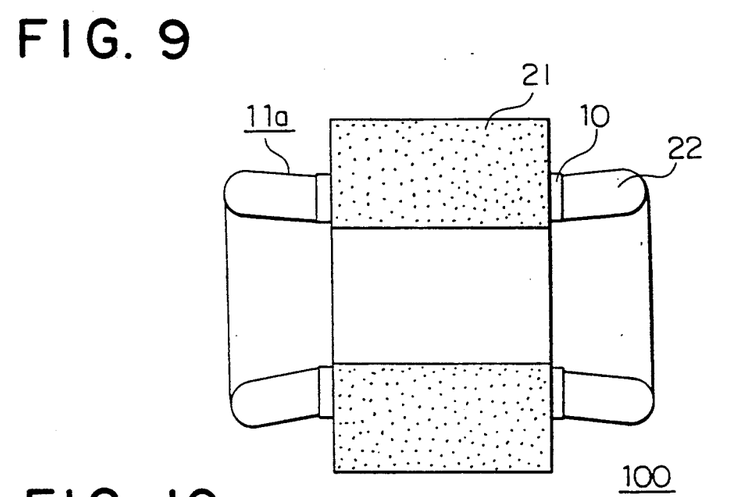
FIG. 9 is a sectional view of a stator core incorporated in the dynamoelectric machine shown in FIG. 8.
Figure 10:
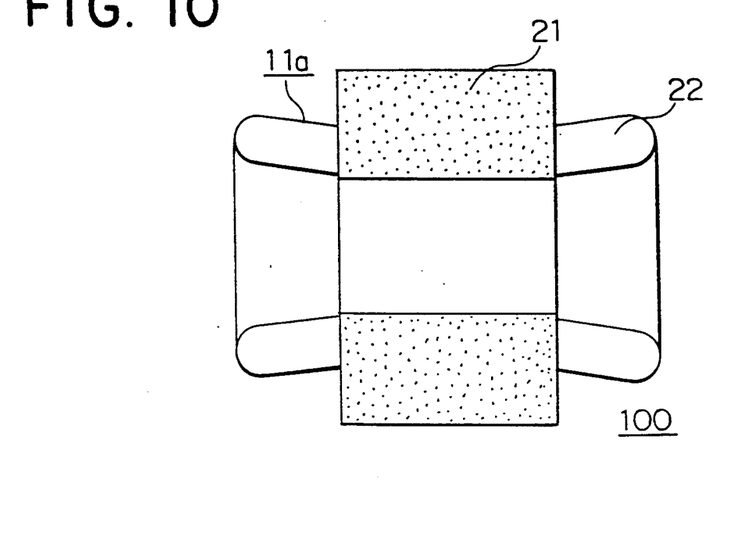
FIG. 10 is a sectional view of the stator core shown in FIG. 9 with insulators removed therefrom.

FIG. 8 is a sectional view of a motor serving an electric machine as an embodiment of the dynamoelectric machine of the present invention, while FIGS. 9 and 10 are sectional views of the stator core used in the motor shown in FIG. 8. In these Figures, parts or components which are the same as those in the conventional machines described before are denoted by the same reference numerals as those used in the Figures showing such conventional machines. Referring to FIG. 8, a stator 100 has a stator core 21 composed of a mold resin containing silicon steel powder. The stator 100 is formed by embedding later-mentioned magnetic field generating coils 11a in the mold resin. An insulator 10 shown in FIG. 9 is used to provide an insulation between the stator core 21 and the magnetic field generating coil 11a including coil ends 22. The stator core 21 itself is not conductive inherently but the insulator 10 is used for the purpose of ensuring safety. Thus, the insulator 10 may be omitted as shown in FIG. 10.

Figure 11:
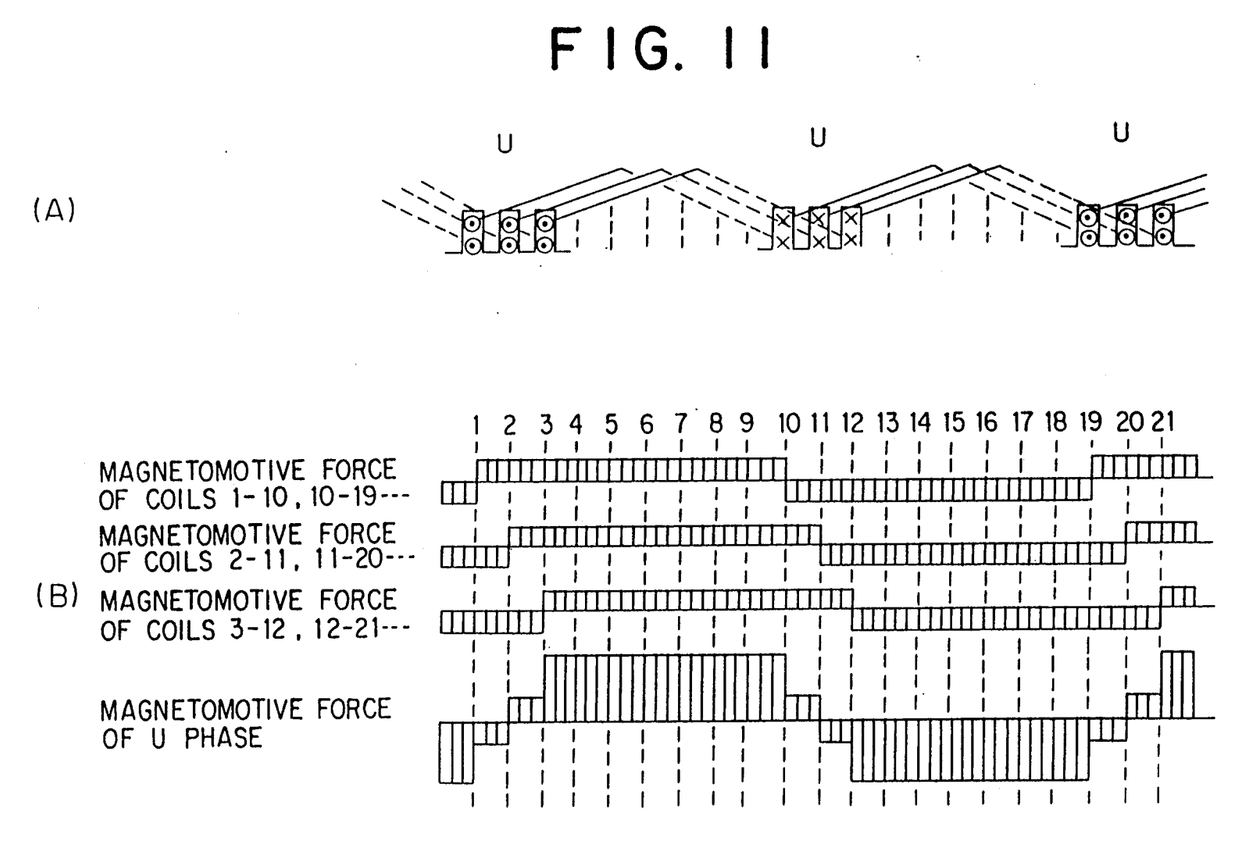
FIG. 11 is an illustration of the coil arrangement and magnetomotive forces produced in the stator core of FIGS. 8 to 10, obtained when the stator is of 3-phase 4-pole type.
Figure 12:
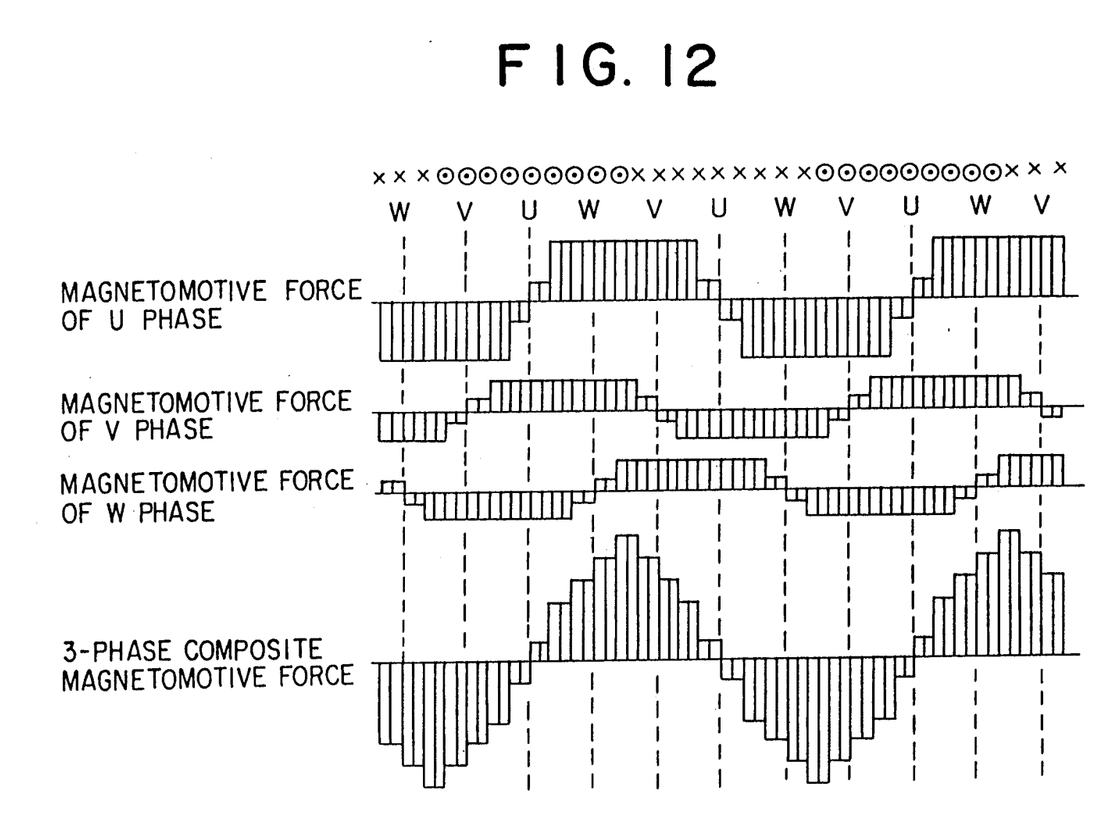
FIG. 12 is an illustration of the magnetomotive forces of U, V and W phases and 3-phase composite magnetomotive force produced in the stator of FIG. 11.

FIG. 11 shows an arrangement of coils of the magnetic field generating coil in the motor shown in FIGS. 8 to 10, as well as magnetomotive forces produced by the coils. FIG. 11(A) is a developed view of the coil arrangement of U phase as a representative of three phases U, V and W. FIG. 11(B) shows the magnetomotive force of each coil of the U phase, as well as the composite magnetomotive force of the U phase, as obtained when the number of the slots q=3 in each phase. FIG. 12 shows the magnetomotive forces of the respective phases U, V and W, as well as the composite magnetomotive force produced by all these three phases U, V and W. The concepts of the number of slots q for each pole in each phase and the total slot number Ns actually do not exist because there is no slot in the stator core. These concepts, however, are introduced in the description in order to facilitate the understanding of the invention.

Figure 13:
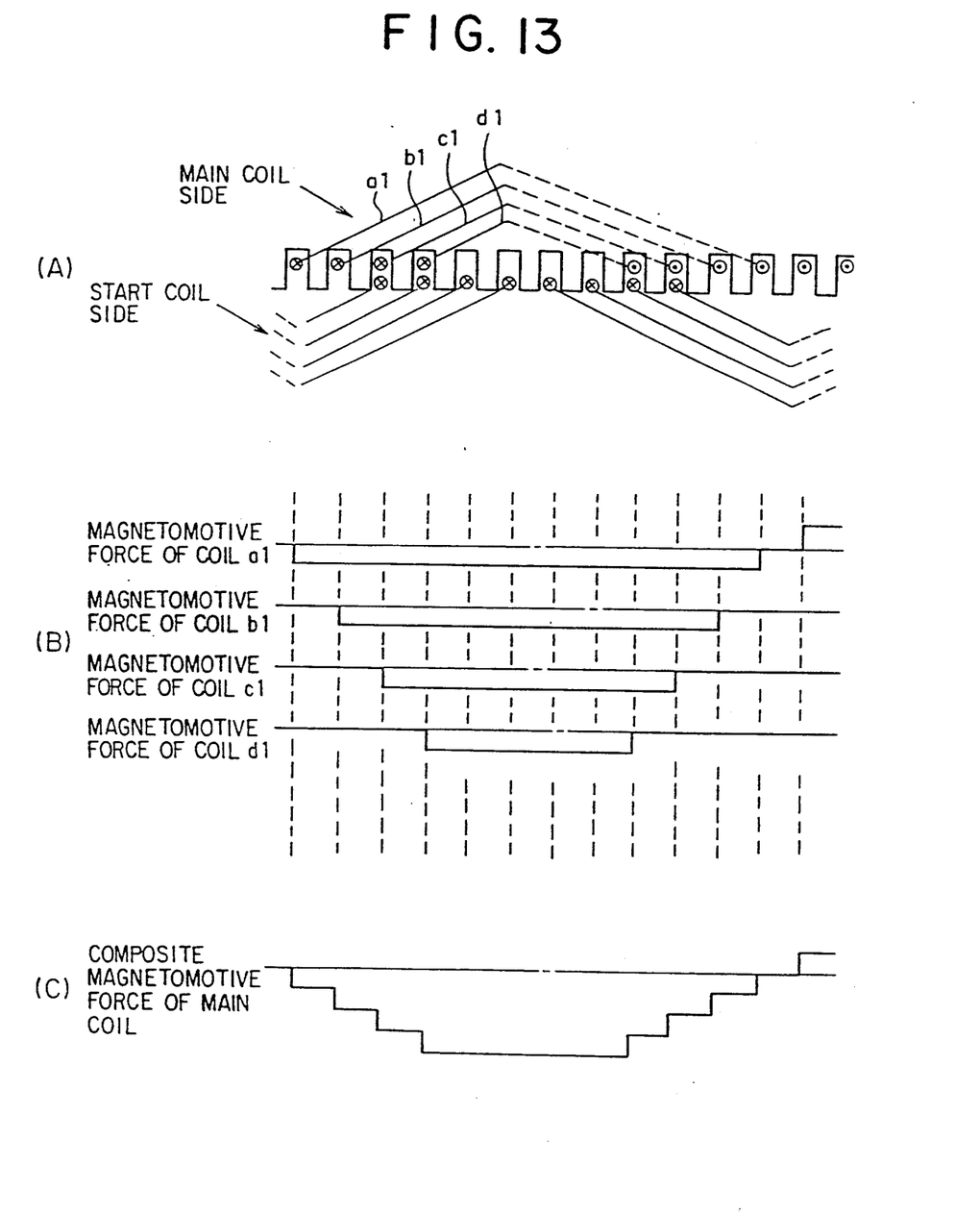
FIG. 13 is an illustration of a coil arrangement on a stator core of single-phase 4-pole type with total number $Ns=48$, showing also magnetomotive forces produced by coils.

FIG. 13 is an illustration of the arrangement of the magnetic field generating coil and magentomotive forces in another embodiment of the present invention. More specifically, FIG. 13(A) shows the arrangement of the coil when the stator core is of single-phase 4-pole type with the total number of the slots Ns=48. FIG. 13(B) shows magnetomotive force of each coil, while FIG. 13(C) shows the single-phase composite magnetomotive force produced by all the coils. The concept of the number of the slots Ns is the same as that employed in the description of the embodiment shown in FIG. 12.

Figure 14A:
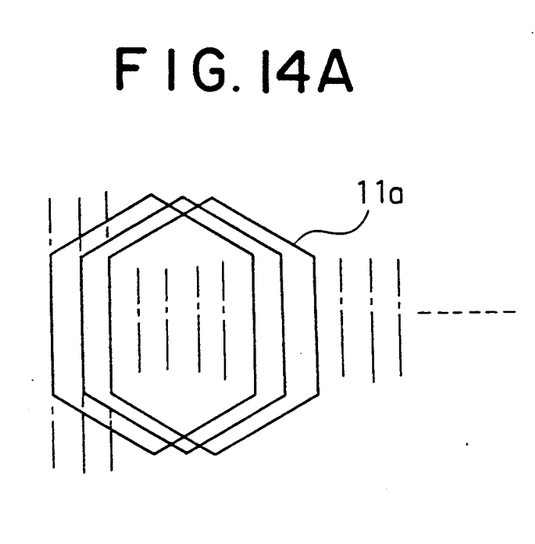
FIG. 14A is a developed view of coils of a magnetic field generating coil disposed in a space.
Figure 14B:
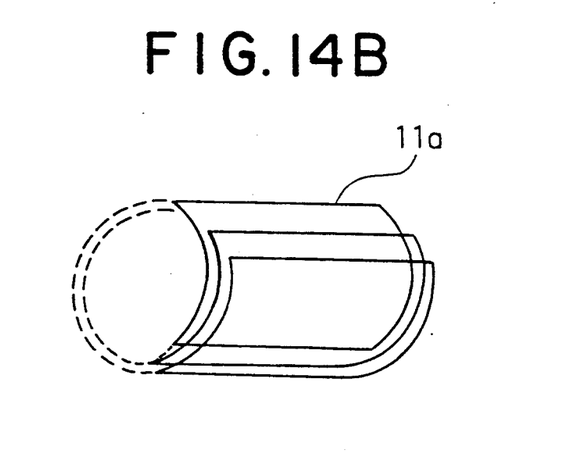
FIG. 14B is a schematic illustration of the states of coils of the magnetic field generating coil disposed in a space.

FIGS. 14A and 14B are schematic illustrations of coil turns of the magnetic field generating coil 11a having hexagonal patterns arranged in a space. More specifically, FIG. 14A shows those coil turns in a state developed in a plane, while FIG. 14B shows the coil turns arranged three-dimensionally in a space, in a state immediately before molding in the mold resin containing silicon steel powder.

In the embodiment shown in FIGS. 11 and 12, the manners of generation of the magnetomotive force are basically the same as those in ordinary 3-phase and 4-phase stator cores with total number of slots Ns=36, though the total number of slots Ns is 12 in the conventional motors shown in FIGS. 5 and 6. The magnetic field generating coil 11a is arranged in a space as shown in FIG. 11 and is molded in the mold resin containing silicon steel powder.

In this case, as shown in FIG. 12, the 3-phase composite magnetomotive force approximates a sine waveform with a high degree of approximation. The waveform shown in FIG. 12 has been obtained on condition of a phase relation such that, when the maximum current Im is being supplied to the U phase, the levels of the currents in other phases V and W are −Im/2. Therefore, the waveform of the 3-phase composite magnetomotive force shown in FIG. 12 remains unchanged regardless of lapse of the time, though the position of the waveform advances in relation to time.

FIG. 13 shows an embodiment in which the stator is of single-phase 4-pole type as in the case of the known motor shown in FIG. 7. In this embodiment, however, the total number of the slots Ns=48, whereas, in the known motor shown in FIG. 7, the total number Ns is 24.

The embodiment shown in FIG. 13 can be fabricated by a process which is substantially the same as that for the embodiment shown in FIG. 11. It will be seen that the embodiment shown in FIG. 13 provides a much greater degree of approximation of the sine waveform than the known motor in which the stator core has only 24 slots.

In the embodiment shown in FIG. 13, the coils a1, b1, c1 and d1 have an equal number of turns. In order to approximate the sine waveform as much as possible, it is preferred that the numbers of turns of each coil are suitably varied. Such a measure has also been taken conventionally, but the following problems existed when the stator core is made from core plates which are punched out from sheets, i.e., when the stator core has a definite number of rigid slots. Namely, in such a known stator core, all the slots have an equal fixed width so that, if the numbers of turns of the coils are varied, some of the coils may fail to be received in the associated slots because of insufficiency of the slot size. This problem, however, is overcome by the present invention because the coils having various numbers of turns can be arranged in a free space and then molded with the mold resin. According to the invention, therefore, it is possible to obtain a composite magnetomotive force which approximates sine waveform with much greater degree of approximation.

A description will now be given of the production procedure and the manner in which magnetomotive forces are generated.

As the first step, a magnetic field generating coil is produced as shown in FIGS. 14A and 14B is set in a mold with the aid of suitable jigs such that the coil can spatially produce magnetomotive force of sine waveform. The setting of the magnetic field generating coil can be done without any restriction, so as to produce magnetomotive force approximating a sine waveform with maximum degree of approximation, unlike the case of known motor in which the coils have to be set in slots of rigid stator core formed from silicon steel core plates punched out from silicon steel sheets to have slots of a fixed positions and size.

Then, a mold resin containing a silicon steel powder is charged in the mold so as to embed the field generating coil, whereby a molded stator is formed as shown in FIGS. 9 and 10. The silicon steel is dispersed in the form of powder particles in the mold resin so that the molded stator core is an insulating member rather than a conductive member. Therefore, the necessity for slot insulators essentially used in known motors is eliminated. insulators essentially used in known motors is eliminated. Thus, the space factor, if this concept is allowed to be introduced, becomes 100% in the described embodiments.

Furthermore, restriction from the view point of strength of the slot interval portions is completely eliminated because the stator core can be formed integrally.

If a greater degree of electrical insulation is required, it is possible to integrally mold the magnetic field generating coil, the silicon steel powder, the mold resin and an insulator wound on the magnetic field generating coil, as shown in FIG. 9.

According to the invention, therefore, it is possible to increase the total number of the slots Ns substantially unlimitedly, although no slot is formed actually in the stator core used in the described embodiments.

In the known dynamoelectric machines of the type described in FIGS. 1-4, the stator core 6 is formed by laminating a plurality of stator core plates 6a of silicon steel, so that iron loss is generated in the portion of the stator core 6 near each coil end 7, due to the A.C. current flowing in the coil end. Therefore, it has not been allowed to position the coil ends 7 in the close proximity of the laminated stator core 6. In contrast, according to the invention, the A.C. current flowing in the coils ends 7 does not produce any iron loss in the stator core 21 because the magnetic field generating coil is embedded in the mold resin containing the silicon steel powder. This is because the stator core 21, which is a mixture of the silicon steel powder and the mold resin, exhibits a large magnetic resistance also in the direction perpendicular to the axis of the motor shaft 9. Therefore, no iron loss is produced even when the coil ends 7 are positioned in the close proximity of the stator core 21, whereby the aforementioned undesirable effects such as a temperature rise or reduction in the efficiency are avoided.

Figure 15:
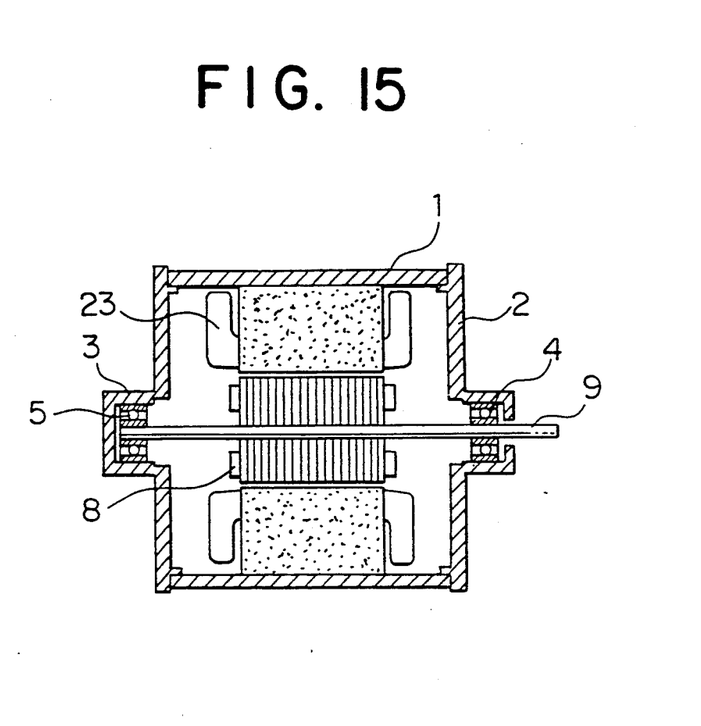
FIG. 15 is a sectional view of a dynamoelectric machine of still another embodiment.
Figure 16:
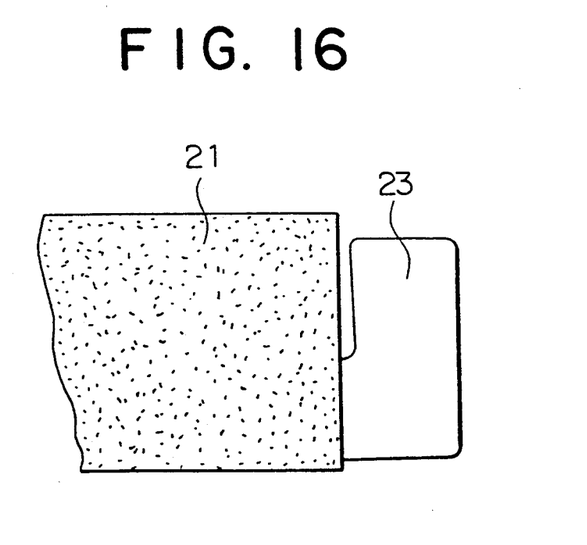
FIG. 16 is an enlarged view of the stator incorporated in the dynamoelectric machine shown in FIG. 15.

According to the invention, as stated before, it is possible to position the coil ends 23 in close proximity to the stator core 21 as shown in FIGS. 15 and 16. Consequently, the size of the stator can be reduced in the direction of axis of the motor shaft 9. Thus, the present invention also offers and advantage of reduced size of the motor, i.e., dynamoelectric machine.

As has been described, in the dynamoelectric machine of the present invention, the magnetic field generated by the magnetic field generating coil approximates a sine waveform with a very high degree of approximation, by virtue of the fact that the magnetic field generating coil is integrally molded with a mold resin containing silicon steel powder.

According to the invention, therefore, it is possible to obtain a highly precise dynamoelectric machine which can operate without generation of any abnormal torque and high-frequency loss.

What is claimed is:

1. A dynamoelectric machine comprising:
    a rotor having a rotor shaft;
    a stator having a magnetic field generating coil including a plurality of coil turns arranged around said stator so as to produce magnetic fields having waveforms approximating a sine waveform, each coil turn having coil ends on both ends of said stator as viewed in the direction of an axis of rotation of the rotor shaft, and a stator core made of a mold resin containing silicon steel powder and integrally embedding the magnetic field generating coil such that the coil ends are exposed from both ends of the stator core; and
    a casing fixing and supporting said stator so as to cover said stator and rotatably supporting said rotor shaft.

2. A dynamoelectric machine according to claim 1, wherein each coil end of said magnetic field generating coil is bent substantially at a right angle to the axis of said rotor shaft so as to extend radially along outer side surfaces of the stator core, thereby reducing the size of said casing in the direction of the axis of said rotor shaft.

3. A dynamoelectric machine according to claim 2, further comprising insulation strengthening means provided between said magnetic field generating coil and said stator core so as to provide electrical insulation therebetween.

4. A stator arranged to surround a rotor carried by a rotor shaft of a dynamoelectric machine, comprising:
    a magnetic field generating coil including a plurality of coil turns arranged around said stator so as to produce magnetic fields having waveforms approximating a sine waveform, each of the coil turns having coil ends on both ends of said stator as viewed in the direction of an axis of rotation said rotor shaft; and
    a stator core made of a mold resin containing a silicon steel powder and integrally embedding said magnetic field generating coil such that said coil ends are exposed from both ends of said stator core.

5. A stator of a dynamoelectric machine according to claim 4, wherein each of the coil end of said magnetic field generating coil is bent substantially at a right angle to the axis of said rotor shaft so as to extend radially along the outer side surfaces of said stator core.

6. A stator of a dynamoelectric machine according to claim 5, further comprising insulation strengthening means provided between said magnetic field generating coil and said stator core so as to provide electrical insulation therebetween.

* * * * *